US011923124B2

(12) United States Patent
Yang et al.

(10) Patent No.: US 11,923,124 B2
(45) Date of Patent: Mar. 5, 2024

(54) COIL COMPONENT

(71) Applicant: SAMSUNG ELECTRO-MECHANICS CO., LTD., Suwon-si (KR)

(72) Inventors: Ju Hwan Yang, Suwon-si (KR); Jae Hun Kim, Suwon-si (KR); Joung Gul Ryu, Suwon-si (KR); Byung Soo Kang, Suwon-si (KR); Byeong Cheol Moon, Suwon-si (KR); Jeong Gu Yeo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 619 days.

(21) Appl. No.: 16/530,391

(22) Filed: Aug. 2, 2019

(65) Prior Publication Data

US 2021/0027931 A1 Jan. 28, 2021

(30) Foreign Application Priority Data

May 15, 2019 (KR) ........................ 10-2019-0057062

(51) Int. Cl.
*H01F 27/28* (2006.01)

(52) U.S. Cl.
CPC . *H01F 27/2804* (2013.01); *H01F 2027/2819* (2013.01)

(58) Field of Classification Search
CPC ......... H01F 17/0013; H01F 2027/2809; H01F 17/0006; H01F 27/2804; H01F 5/003;
(Continued)

(56) References Cited

U.S. PATENT DOCUMENTS 10,475,570 B2 11/2019 Kido
2015/0102891 A1* 4/2015 Yoon .................. H01F 27/2804 336/200
(Continued)

FOREIGN PATENT DOCUMENTS

CN 104575946 A 4/2015
CN 105742035 A 7/2016
(Continued)

OTHER PUBLICATIONS

Korean Office Action dated May 12, 2020 issued in Korean Patent Application No. 10-2019-0057062 (with English translation).
(Continued)

*Primary Examiner* — Tszfung J Chan
(74) *Attorney, Agent, or Firm* — Morgan, Lewis & Bockius LLP

(57) ABSTRACT

A coil component includes a body having one surface, and one end surface and the other end surface, respectively connected to the one surface and opposing each other, a support substrate embedded in the body, and a coil portion disposed on the support substrate and including first and second lead-out patterns respectively exposed from surfaces of the body. The first lead-out pattern is exposed from the one surface of the body and the one end surface of the body. The second lead-out pattern is exposed from the one surface of the body and the other end surface of the body. The body includes an anchor portion disposed in each of the first and second lead-out patterns.

15 Claims, 11 Drawing Sheets

(58) Field of Classification Search
CPC ........ H01F 27/29; H01F 27/292; H01F 27/24; H01F 41/041; H01F 27/324
USPC .................................................. 336/200, 232
See application file for complete search history.

(56) References Cited

U.S. PATENT DOCUMENTS

| | | | | |
|---|---|---|---|---|
| 2016/0163444 | A1* | 6/2016 | Choi | H01F 41/043 336/200 |
| 2016/0189840 | A1 | 6/2016 | Ahn et al. | |
| 2016/0293320 | A1* | 10/2016 | Kim | H01F 17/0013 |
| 2016/0343489 | A1* | 11/2016 | Horikawa | H01F 27/292 |
| 2017/0178798 | A1* | 6/2017 | Yoon | H01F 41/041 |
| 2017/0256352 | A1 | 9/2017 | Kido | |
| 2018/0122546 | A1* | 5/2018 | Lee | H01F 27/32 |
| 2018/0268987 | A1 | 9/2018 | Yoon et al. | |
| 2018/0286561 | A1* | 10/2018 | Shimoichi | H01F 27/28 |
| 2018/0308612 | A1* | 10/2018 | Park | H01F 27/292 |
| 2018/0323003 | A1 | 11/2018 | Fujii et al. | |
| 2018/0342341 | A1* | 11/2018 | Aoki | H01F 27/292 |
| 2018/0366246 | A1 | 12/2018 | Park et al. | |

FOREIGN PATENT DOCUMENTS

| | | | | |
|---|---|---|---|---|
| CN | 106486267 | A | 3/2017 | |
| CN | 107154300 | A | 9/2017 | |
| CN | 108806950 | A | 11/2018 | |
| JP | 2017-157770 | A | 9/2017 | |
| JP | 2018174306 | A * | 11/2018 | |
| JP | 2018190828 | A * | 11/2018 | H01F 17/0013 |
| KR | 10-2015-0044372 | A | 4/2015 | |
| KR | 10-1670184 | B1 | 10/2016 | |
| KR | 10-2017-0060577 | A | 6/2017 | |
| KR | 2018012621 | A * | 2/2018 | H01F 17/0013 |
| KR | 10-2018-0065801 | A | 6/2018 | |
| KR | 10-2018-0105513 | A | 9/2018 | |

OTHER PUBLICATIONS

Office Action dated Nov. 20, 2023 issued in the corresponding Chinese Patent Application No. 201911126658.6 with English translation.

* cited by examiner

COIL COMPONENT

CROSS-REFERENCE TO RELATED APPLICATION(S)

This application claims the benefit under 35 USC 119(a) of Korean Patent Application No. 10-2019-0057062 filed on May 15, 2019 in the Korean Intellectual Property Office, the entire disclosure of which is incorporated herein by reference for all purposes.

TECHNICAL FIELD

The present disclosure relates to a coil component.

BACKGROUND

Inductors, coil components, are representative passive electronic components used in electronic devices along with resistors and capacitors.

With electronic devices having increasingly higher performance and smaller sizes, the number of coil components used in electronic devices has been increasing while the size thereof has been decreasing.

In the case of a general thin film type inductor, since a body includes metal powder as a conductor, an insulating film is interposed between a coil and the body for electrical insulation between the coil and the body.

On the other hand, as a relative area occupied by a lead-out pattern of a coil in the body increases, coupling force between the lead-out pattern and the body may be reduced by the above-described insulating film.

SUMMARY

An aspect of the present disclosure is to provide a coil component in which reliability of coupling between a coil and a body may be secured.

According to an aspect of the present disclosure, a coil component includes a body having one surface, and one end surface and the other end surface, respectively connected to the one surface and opposing each other, a support substrate embedded in the body, and a coil portion disposed on the support substrate and including a first lead-out pattern and a second lead-out pattern respectively exposed from surfaces of the body. The first lead-out pattern is exposed from the one surface of the body and the one end surface of the body. The second lead-out pattern is exposed from the one surface of the body and the other end surface of the body. The body includes an anchor portion disposed in each of the first and second lead-out patterns.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
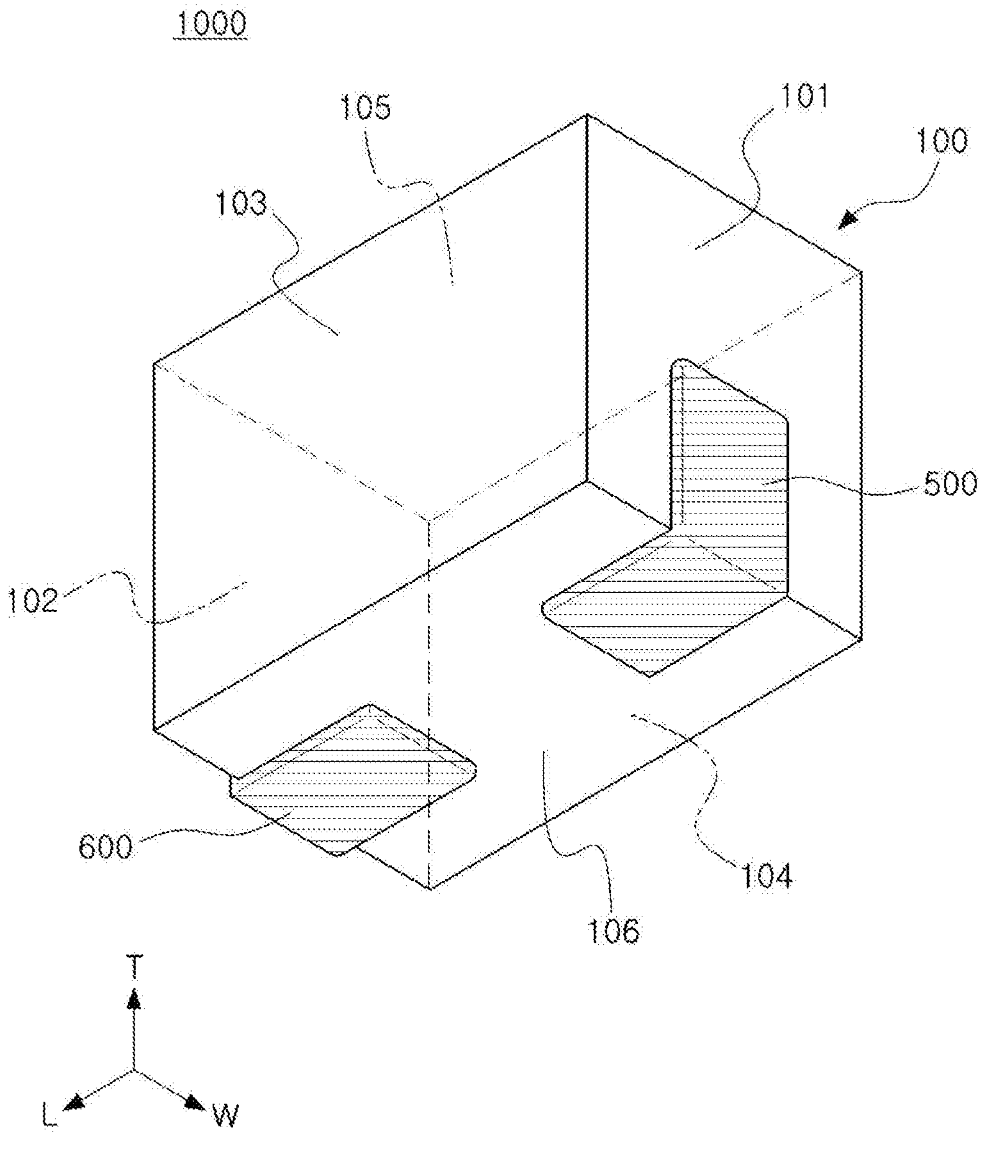
FIGS. 1 to 3 schematically illustrate a coil component according to a first embodiment of the present disclosure when viewed from a lower side.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "including", "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Throughout the specification, it will be understood that when an element, such as a layer, region or wafer (substrate), is referred to as being "on," "connected to," or "coupled to" another element, it may be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

In addition, the term "coupled" is used not only in the case of direct physical contact between the respective constituent elements in the contact relation between the constituent elements, but also in the case in which other constituent elements are interposed between the constituent elements such that they are in respective contact with each other, being used as a comprehensive concept.

The drawings may not be to scale, and the relative size, proportions, and depiction of elements in the drawings may be exaggerated for clarity, illustration, and convenience.

In the drawings, the L direction may be defined as a first direction or a length direction, the W direction as a second direction or a width direction, and the T direction as a third direction or a thickness direction.

Hereinafter, a coil component according to an embodiment in the present disclosure will be described in detail with reference to the accompanying drawings.

Referring to the accompanying drawings, the same or corresponding components are denoted by the same reference numerals, and redundant descriptions thereof will be omitted.

Various types of electronic parts are used in electronic devices. Various types of coil components may be suitably used for noise removal or the like between these electronic parts.

For example, as a coil component in an electronic device, a power inductor, a high frequency inductor (HF Inductor), a general bead, a bead for high frequency (GHz Bead), a common mode filter, or the liken used.

First Embodiment

Figure 2:
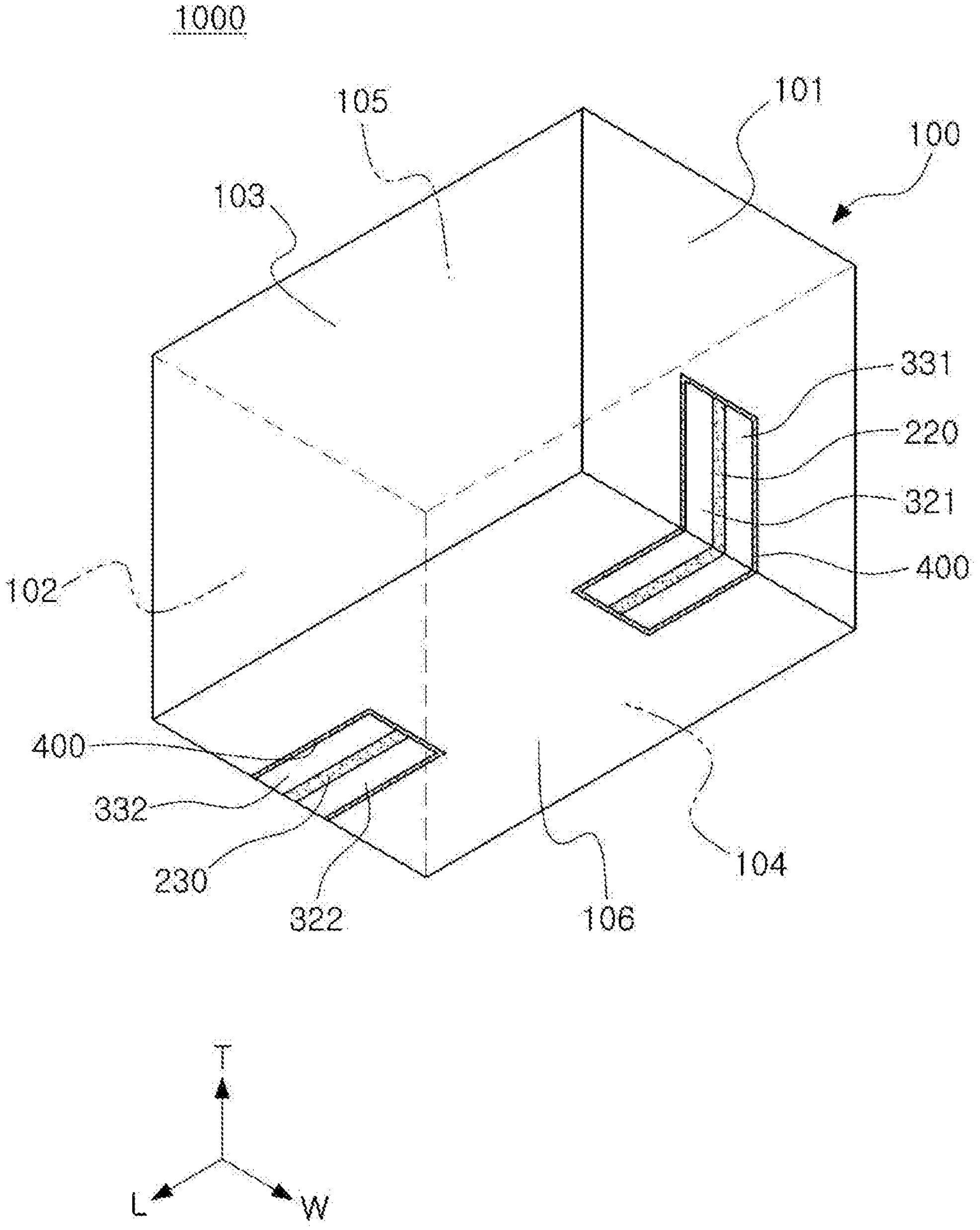
Figure 3:
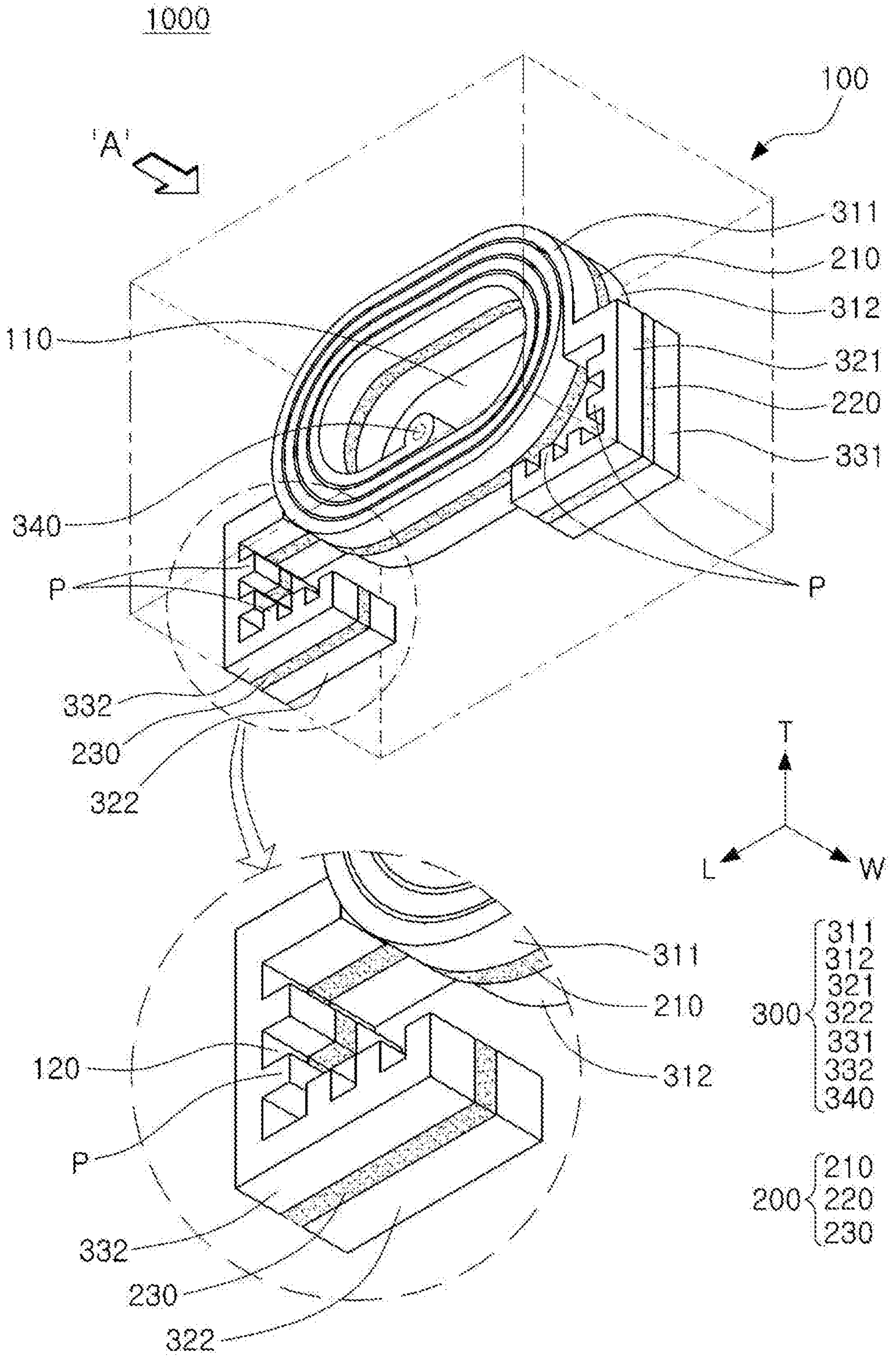
Figure 4:
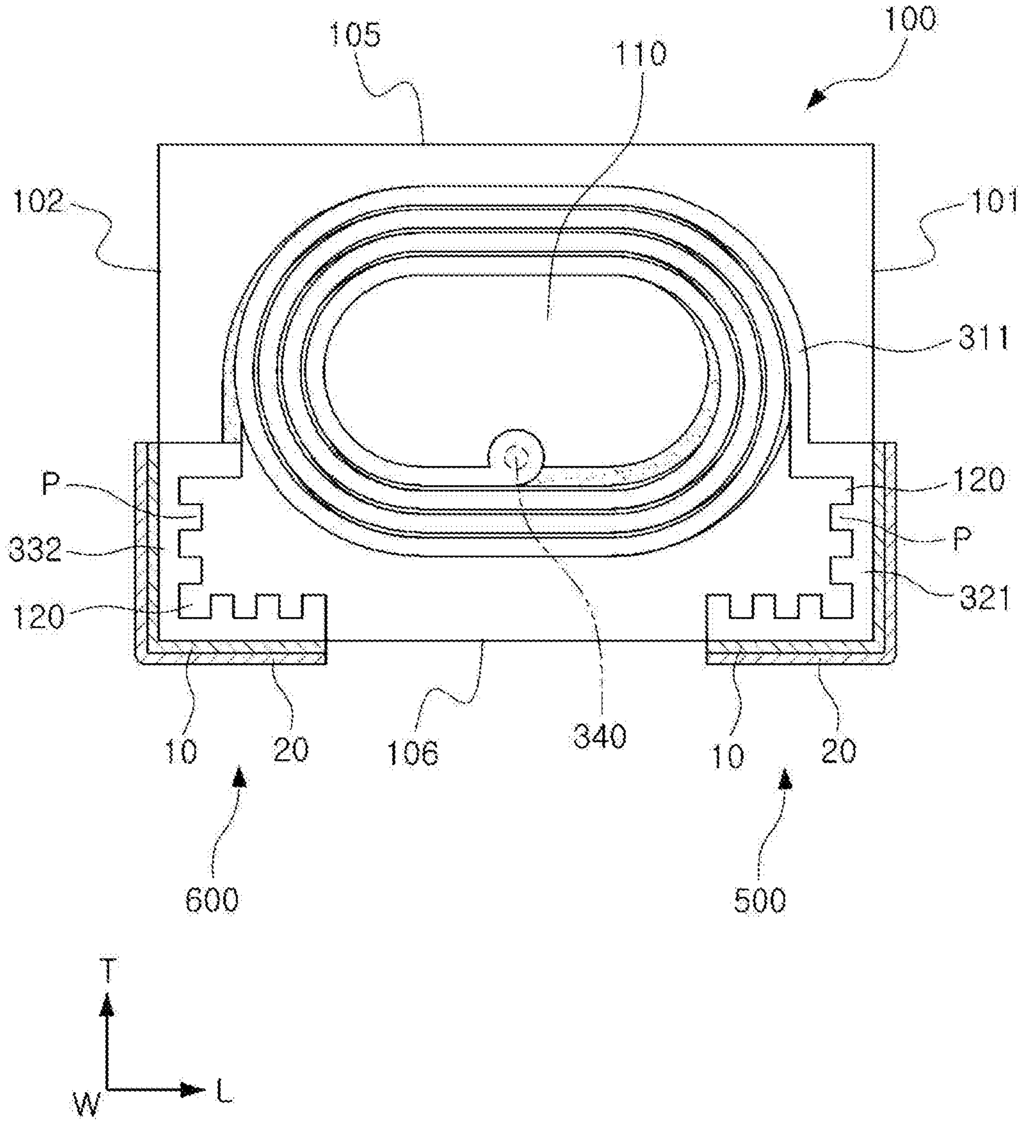
FIG. 4 is a schematic view of a coil component, viewed in direction A in FIG. 3.

FIGS. 1 to 3 schematically illustrate a coil component according to a first embodiment when viewed from a lower side. FIG. 4 is a schematic view of a coil component, viewed in direction A in FIG. 3. On the other hand, for the sake of understanding, FIGS. 1 and 2 mainly illustrate the appearance of a coil component according to an embodiment, and FIG. 3 mainly illustrates an internal structure of a coil component according to the embodiment. To facilitate understanding, in the case of FIGS. 2 and 3, some constructions applied to the embodiment are omitted. To facilitate understanding, FIG. 4 illustrates the internal structure as a center as viewed in direction A in FIG. 3.

Referring to FIGS. 1 to 4, a coil component 1000 according to a first embodiment includes a body 100, a support substrate 200, a coil portion 300, an insulating film 400, and external electrodes 500 and 600. The support substrate 200 includes a support portion 210 and distal ends 220 and 230. The coil portion 300 includes lead-out patterns 321 and 322, auxiliary lead-out patterns 331 and 332, and a via 340.

The body 100 forms the exterior of the coil component 1000 according to the embodiment, and the coil portion 300 is embedded in the body 100. The body 100 includes an anchor portion 120 inserted into each of the lead-out patterns 321 and 322, for example, first and second lead-out patterns 321 and 322 to be described later, which will be described later.

The body 100 may be formed to have a hexahedral shape as a whole.

Based on FIGS. 1 and 2, the body 100 includes a first surface 101 and a second surface 102 facing each other in a length direction L, a third surface 103 and a fourth surface 104 facing each other in a width direction W, and a fifth surface 105 and a sixth surface 106 facing each other in a thickness direction T. Each of the first to fourth surfaces 101, 102, 103 and 104 of the body 100 corresponds to a wall surface of the body 100, connecting the fifth surface 105 and the sixth surface 106 of the body 100. In the following, both end surfaces of the body 100 refer to the first surface 101 and the second surface 102 of the body, and both side surfaces of the body 100 refer to as the third surface 103 and fourth surface 103 of the body 100. Further, one surface and the other surface of the body 100 may refer to the sixth surface 106 and the fifth surface 105 of the body 100, respectively.

The body 100 may be formed in such a manner that the coil component 1000 according to the embodiment, having external electrodes 500 and 600 to be described later, has a length of 1.0 mm, a width of 0.6 mm, and a thickness of 0.8 mm, but an embodiment thereof is not limited thereto. On the other hand, the numerical values described above are merely design values without reflecting process errors or the like therein, and thus, should be considered to be within the scope of the present disclosure as long as the extent thereof is recognized to be within process errors.

The body 100 may include a magnetic material and a resin. As a result, the body 100 has magnetism. The body 100 may be formed by laminating one or more magnetic composite sheets containing a resin and a magnetic material dispersed in a resin. Further, the body 100 may also have a structure other than the structure in which the magnetic material is dispersed in the resin. For example, the body 100 may also be formed of a magnetic material such as ferrite.

The magnetic material may be ferrite or a metal magnetic powder.

Ferrite powder may be one or more of spinel type ferrite such as Mg—Zn type, Mn—Zn type, Mn—Mg type, Cu—Zn type, Mg—Mn—Sr type, Ni—Zn type or the like, hexagonal ferrite such as Ba—Zn, Ba—Mg, Ba—Ni, Ba—Co, Ba—Ni—Co type, or the like, garnet type ferrite such as Y type or the like, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu) and nickel (Ni). For example, the metal magnetic powder may be at least one or more selected from the group consisting of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe—Cr—Al alloy powder.

The metal magnetic powder may be amorphous or crystalline. For example, the metal magnetic powder may be an Fe—Si—B—Cr amorphous alloy powder, but is not limited thereto.

The ferrite and the metal magnetic powder may have an average diameter of about 0.1 μm to 30 μm, respectively, but embodiments thereof are not limited thereto.

The body 100 may include two or more kinds of magnetic materials dispersed in a resin. In this case, the term "different kinds of magnetic materials" means that the magnetic materials dispersed in the resin are distinguished from each other by at least one of an average diameter, a composition, crystallinity and a shape.

The resin may include, but is not limited to, epoxy, polyimide, liquid crystal polymer, or the like, alone or in combination.

The body 100 includes a core 110 passing through the coil portion 300 and the support substrate 200 to be described later. The core 110 may be formed by filling a through hole of the coil portion 300 with a magnetic composite sheet, but an embodiment thereof is not limited thereto.

The support substrate 200 is embedded in the body 100. In detail, the support substrate 200 is embedded in the body 100 to be perpendicular to one surface 106 of the body 100. Thus, the coil portion 300 disposed on the support substrate 200 is disposed to be perpendicular to one surface 106 of the body 100. The support substrate 200 includes the support portion 210 and the distal ends 220 and 230. The support portion 210 supports the first and second coil patterns 311 and 312, which will be described later. In the case of the distal ends, for example, a first distal end 220 supports the first lead-out pattern 321 and the auxiliary lead-out pattern 331, for example, the first auxiliary lead-out pattern 331, and a second distal end 230 supports the second lead-out pattern 322 and the auxiliary lead-out pattern 332, for example, the second auxiliary lead-out pattern 332.

The support substrate 200 may be formed of an insulating material including a thermosetting insulating resin such as an epoxy resin, a thermoplastic insulating resin such as polyimide, or a photoimageable dielectric resin, or an insulating material including a reinforcing material such as a glass fiber or an inorganic filler with these insulating resins. For example, the support substrate 200 may be formed of a material such as a prepreg, an Ajinomoto Build-up Film (ABF), a Bismaleimide Triazine (FR-4), a bismaleimide triazine (BT) resin, a Photo Imageable Dielectric (PID), or a Copper Clad Laminate (CCL), or the like, but the material thereof is not limited thereto.

The inorganic filler may be one or more selected from the group consisting of silica ($SiO_2$), alumina ($Al_2O_3$), silicon carbide (SiC), barium sulphate ($BaSO_4$), talc, mud, mica powder, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$).

In the case in which the support substrate 200 is formed of an insulating material including a reinforcing material, the support substrate 200 may provide relatively better rigidity. In the case in which the support substrate 200 is formed of an insulating material that does not include glass fibers, an overall thickness of the coil portion 300 may be reduced by the support substrate 200, and a width of the coil component 1000 according to the embodiment may thus be reduced.

The coil portion 300 is disposed on the support substrate 200. The coil portion 300 is embedded in the body 100 to exhibit characteristics of a coil component. For example, when the coil component 1000 according to the embodiment is used as a power inductor, the coil portion 300 may function to stabilize the power supply of an electronic device by storing an electric field as a magnetic field and maintaining an output voltage.

The coil portion 300 is formed on at least one of opposite surfaces of the support substrate 200, and has at least one turn. In this embodiment, the coil portion 300 includes first and second coil patterns 311 and 312, disposed on both surfaces of the support portion 210 facing opposing other in the width direction W of the body 100, respectively, to face each other, a first lead-out pattern 321 and a first auxiliary lead-out pattern 331 disposed on both surfaces of the first distal end 220, respectively, to face each other, and a second lead-out pattern 322 and a second auxiliary lead-out pattern 332 disposed on both surfaces of the second distal end 230, respectively, to face each other. The coil portion 300 also includes the via 340 penetrating through the support portion 210 to connect the first and second coil patterns 311 and 312 to each other.

Each of the first coil pattern 311 and the second coil pattern 312 may be formed to have the form of a plane helix having at least one turn about the core 110. As an example, based on the direction of FIG. 3, the first coil pattern 311 may form at least one turn about the core 110 on one surface of the support portion 210. The second coil pattern 312 forms at least one turn about the core 110 on the other surface of the support 210.

Referring to FIG. 3, the first lead-out pattern 321 is disposed on one surface of the first distal end 220 and extends from the first coil pattern 311 to be exposed to one end surface 101 of the body 100 and one surface 106 of the body 100. The second lead-out pattern 322 is disposed on the other surface of the second distal end 230 and extends from the second coil pattern 312 to be exposed to the other end surface 102 of the body 100 and one surface 106 of the body 100. For example, the first and second lead-out patterns 321 and 322 are embedded in the body 100, to have an L-shape as a whole.

The first lead-out pattern 321 may be continuously exposed to the first surface 101 and the sixth surface 106 of the body 100. The second lead-out pattern 322 may be continuously exposed to the second surface 102 and the sixth surface 106 of the body 100. When the first lead-out pattern 321 is continuously exposed to the first surface 101 and the sixth surface 106 of the body 100, a contact area of the first lead-out pattern 321 with the first external electrode 500 to be described later may be increased to increase coupling force therebetween. When the second lead-out pattern 322 is continuously exposed to the second surface 102 and the sixth surface 106 of the body 100, a contact area of the second lead-out pattern 322 with the second external electrode 600 to be described later may be increased, to increase coupling force therebetween.

The first auxiliary lead-out pattern 331 is disposed on the other surface of the first distal end 220 to correspond to the first lead-out pattern 321, and is spaced apart from the second coil pattern 312. The first auxiliary lead-out pattern 331 and the first lead-out pattern 321 are connected to each other by connection vias passing through the first distal end 220. The second auxiliary lead-out pattern 332 is disposed on one surface of the second distal end 230 to correspond to the second lead-out pattern 322, and is spaced apart from the first coil pattern 311. The second auxiliary lead-out pattern 332 and the second lead-out pattern 322 are connected to each other by connection vias passing through the second distal end 230. The coupling reliability between the external electrodes 500 and 600 and the coil portion 300 may be increased due to the first and second auxiliary lead-out patterns 331 and 332.

The first coil pattern 311 and the first lead-out pattern 321 may be integrally formed without forming a boundary therebetween. The second coil pattern 312 and the second lead-out pattern 322 may be integrally formed without forming a boundary therebetween. However, embodiments thereof are not limited thereto, and thus, do not exclude a case in which the above-described configurations are formed at different steps to have boundaries therebetween.

At least one of the coil patterns 311 and 312, the via 340, the lead-out patterns 321 and 322 and the auxiliary lead-out patterns 331 and 332 may include at least one conductive layer.

As an example, when the first coil pattern 311, the first lead-out pattern 321, the second auxiliary lead-out pattern 332, and the via 340 are formed on one surface side of the support substrate 200 by plating, each of the first coil pattern 311, the first lead-out pattern 321, the second auxiliary lead-out pattern 332, and the via 340 may include a seed layer and an electroplating layer. The seed layer may be formed by a vapor deposition method such as electroless plating or sputtering. Each of the seed layer and the electroplating layer may have a single-layer structure or a multi-layer structure. The electroplating layer of the multi-layer structure may be formed to have a conformal film structure in which one electroplating layer is covered by another electroplating layer, and may also be formed to have a form in which only on one surface of one electroplating layer, another electroplating layer is laminated. The seed layer of the first coil pattern 311 and the seed layer of the via 340 may be integrally formed without forming a boundary therebetween, but an embodiment thereof is not limited thereto. The electroplating layer of the second coil pattern 312 and the electroplating layer of the via 340 may be integrally formed without forming a boundary therebetween, but an embodiment thereof is not limited thereto.

The coil patterns 311 and 312, the lead-out patterns 321 and 322, the auxiliary lead-out patterns 331 and 332 and the via 340 are respectively formed of a conductive material, such as copper (Cu), aluminum (Al), silver (Ag), tin (Sn), gold (Au), nickel (Ni), lead (Pb), titanium (Ti), or alloys thereof.

The insulating film 400 is disposed between each of the support substrate 200 and the coil portion 300, and the body 100. In this embodiment, since the body 100 includes a magnetic metal powder, the insulating film 400 is disposed between the coil portion 300 and the body 100 to insulate the coil portion 300 from the body 100. The insulating film 400 may be formed of parylene or the like, but an embodiment thereof is not limited thereto.

The external electrodes 500 and 600 are spaced apart from each other on one surface 106 of the body 100 and are connected to the first and second lead-out patterns 321 and 322. The first external electrode 500 is in contact with and connected to the first lead-out pattern 321 and the first auxiliary lead-out pattern 331, and the second external electrode 600 is in contact with and is connected to the second lead-out pattern 322 and the second auxiliary lead-out pattern 332.

The external electrodes 500 and 600 electrically connect the coil component 1000 to a printed circuit board or the like when the coil component 1000 according to the embodiment is mounted on the printed circuit board or the like. For example, the coil component 1000 according to the embodiment may be mounted in such a manner that the sixth surface 106 of the body 100 faces an upper surface of the printed circuit board. In this case, since the external electrodes 500 and 600 are disposed on the sixth surface 106 of the body 100 to be spaced apart from each other, connecting portions of the printed circuit board may be electrically connected.

The external electrodes 500 and 600 may include at least one of a conductive resin layer and an electroplating layer. The conductive resin layer may be formed by printing a conductive paste on the surface of the body 100 and curing the conductive paste. The conductive paste may include one or more conductive metals selected from the group consisting of copper (Cu), nickel (Ni), and silver (Ag), and a thermosetting resin. The electroplating layer may include one or more selected from the group consisting of nickel (Ni), copper (Cu), and tin (Sn). The external electrodes 500 and 600 may each include a first plating layer 10 formed on the surface of the body 100 and in direct contact with the lead-out patterns 321 and 322 and the auxiliary lead-out patterns 331 and 332, and a second plating layer 20 disposed on the first plating layer 10. For example, the first plating layer 10 may be a nickel (Ni) plating layer, and the second plating layer 20 may be a tin (Sn) plating layer, but embodiments thereof are not limited thereto.

The anchor portion 120 of the body 100 is inserted into each of the first and second lead-out patterns 321 and 322. The first lead-out pattern 321 has a first external surface exposed to one surface 106 and one end surface 101 of the body 100, and a first internal surface opposing the first external surface, and the anchor portion 120 is inserted into the internal surface side of the first lead-out pattern 321. The second lead-out pattern 322 has a second external surface exposed on one surface 106 and the other end surface 102 of the body 100, and a second internal surface opposing the second external surface, and the anchor portion 120 is inserted into the internal surface side of the second lead-out pattern 322. In this case, the first and second external surfaces of the first and second lead-out patterns 321 and 322 include a surface thereof exposed to the first and sixth surfaces 101 and 106 of the body 100 and a surface thereof exposed to the second and sixth faces 102 and 106 of the body 100, as illustrated in FIG. 2. Accordingly, the first and second internal surfaces opposing the first and second external surfaces refer to the surfaces disposed in the body 100 and not exposed to the surface of the body 100, as illustrated in FIGS. 3 and 4. For example, the first and second internal surfaces of the the first and second lead-out patterns 321 and 322 are surfaces embedded in the body 100.

Referring to FIG. 3, the first and second lead-out patterns 321 and 322 have a plurality of protrusions P on the respective first and second internal surfaces, and the anchor portion 120 is disposed in a recessed region between adjacent protrusions P. The anchor portion 120 may include a portion of the body 100 composed of a material the same as the remaining portion of the body 100. In one example, the insulating film 400 may extend into the recess and cover sidewalls of the protrusion P. In this case, a portion of the insulating film 400 covering the sidewalls of the protrusion P may be disposed between the portion of the body 100 filling the recess and the protrusion P, and the anchor portion 120 may include the portion of the insulating film 400 and the portion of the body 100 filling the recess between adjacent protrusions P. The protrusions P and the anchor portions 120 (or the recesses which the anchor portions 120 fill respectively) may be alternately disposed. The protrusion P may have a thickness substantially equal to the thickness of the first and second lead-out patterns 321 and 322. Therefore, the recessed portion and the anchor portion 120 disposed in the recessed region described above are disposed to pass through the lead-out patterns 321 and 322 in the thickness direction of the lead-out patterns 321 and 322, in the width direction W of the body. An area of contact between the lead-out patterns 321 and 322 and the body 100 are increased due to the protrusions P and the anchor portion 120, and as a result, coupling force between the lead-out patterns 321 and 322 and the body 100 is improved. The protrusions P and the anchor portion 120 may be effective in increasing coupling force between the lead-out patterns 321 and 322 and the body 100, in the case in which the first and second lead-out patterns 321 and 322 in the L shape are embedded in the body 100, as in the embodiment. For example, when the first and second lead-out patterns 321 and 322 in the L shape are embedded in the body 100, the area in which the lead-out patterns 321 and 322 and the body 100 contact with each other is increased as compared with a general case. As a result, the area of the insulating film 400 disposed between the lead-out patterns 321 and 322 and the body 100 increases, and thus, the coupling force between the body 100 and the lead-out patterns 321 and 322 is reduced. In detail, in a case in which the insulating film 400 is formed using N-type perylene, a surface of the insulating film 400 contacting the lead-out patterns 321 and 322 has relatively excellent coupling force in terms of N-type perylene properties, but a surface thereof contacting the body 100 including a resin has relatively low bonding force. Accordingly, in the case of the embodiment in the present disclosure, occurrence of such a problem may be prevented by increasing the coupling area between the lead-out patterns 321 and 322 and the body 100 by using the protrusions P and the anchor portion 120.

Shapes of the distal ends 220 and 230 and the lead-out patterns 321 and 322 correspond to each other. As a result, the distal ends 220 and 230 have regions corresponding to the protrusions P of the lead-out patterns 321 and 322. The anchor portion 120 extends from the region disposed between the protrusions P of the lead-out patterns 321 and 322 to the regions of the distal ends 220 and 230 described above, to be disposed in the above-described regions of the distal ends 220 and 230. For example, the anchor portion 120 may penetrate through the distal ends 220 and 230 in the thickness direction of the distal ends 220 and 230 (the width direction W of the body).

The shapes of the auxiliary lead-out patterns 331 and 332 and the lead-out patterns 321 and 322 correspond to each other. As a result, the protrusions P are also formed on the auxiliary lead-out patterns 331 and 332. The anchor portion 120 may extend to also be disposed in a region between adjacent protrusions P of the auxiliary lead-out patterns 331 and 332. As a result, the anchor portion 120 disposed on the first lead-out pattern 321 side is formed to respectively penetrate through the first lead-out pattern 321, the first distal end 220, and the first auxiliary lead-out pattern 331 in the thickness direction of the first lead-out pattern 321 (the width direction W of the body) to be formed integrally therewith. The anchor portion 120 disposed on the second lead-out pattern 322 side may be formed to respectively penetrate through the second lead-out pattern 322, the second distal end 230 and the second auxiliary lead-out pattern 332 in the thickness direction of the second lead-out pattern 322 (the width direction W of the body) to be formed integrally therewith.

Although not illustrated in the drawings, the coil component 1000 according to the embodiment may further include an insulating layer disposed in a region other than the regions in which the external electrodes 500 and 600 are formed, from among the first to sixth surfaces 101, 102, 103, 104, 105 and 106 of the body 100. The insulating layer may be an oxide film obtained by oxidizing a cut surface having metal magnetic powder and exposed by the first to sixth surfaces 101, 102, 103, 104, 105 and 106 of the body 100, or may be formed by laminating an insulating layer including an insulating resin on the first to sixth surfaces 101 to 106 of the body 100, by vapor deposition of an insulating material on the first to sixth surfaces 101 to 106 of the body 100, or by applying an insulating paste to the first to sixth surfaces 101 to 106 of the body 100, to then be cured. The insulating layer may include a metal oxide film or may include an insulating resin such as epoxy, as described above. The insulating layer may function as a plating resist in forming the external electrodes 500 and 600 by electroplating, but an embodiment thereof is not limited thereto.

Second Embodiment

Figure 5:
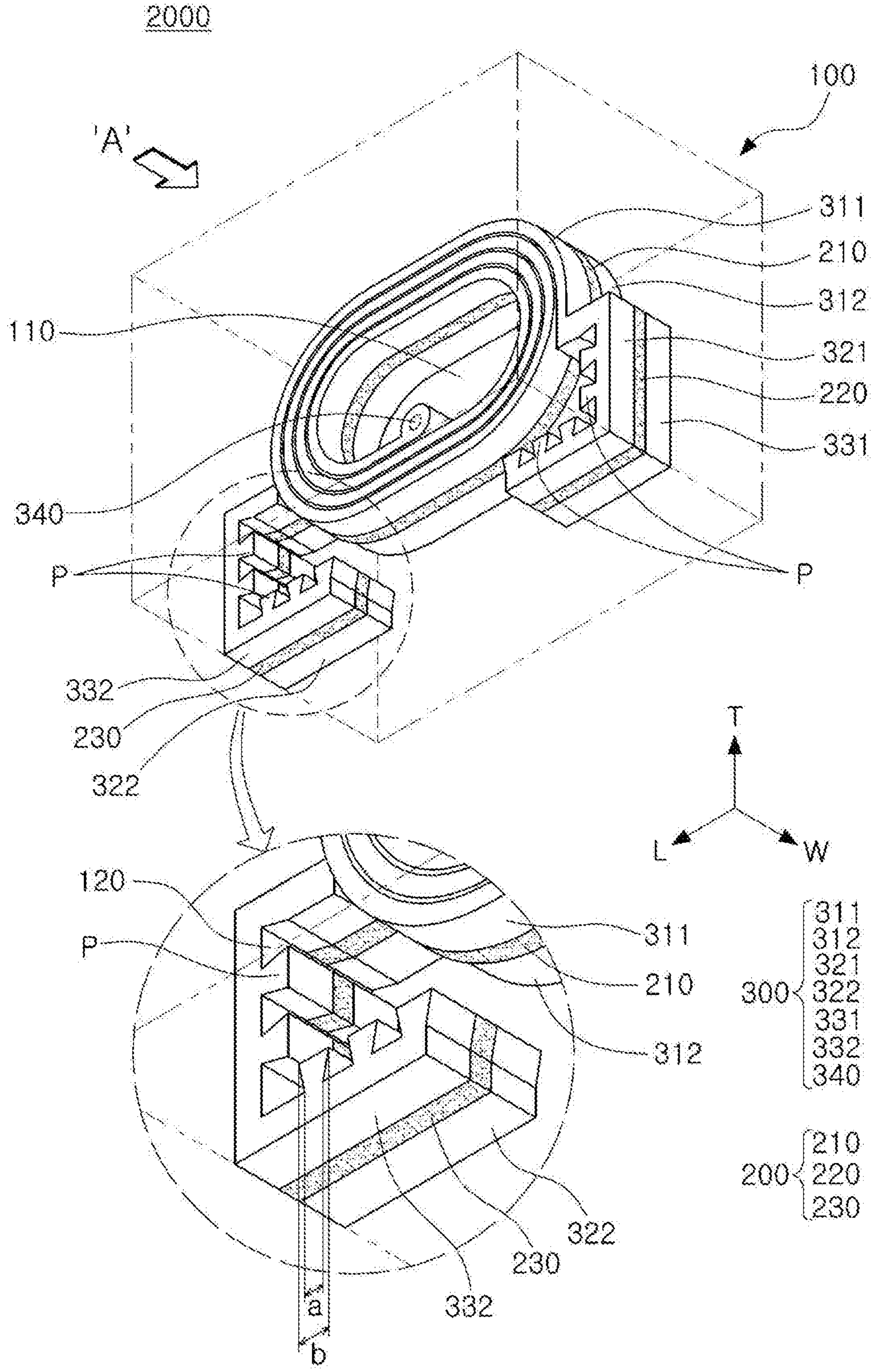
FIG. 5 is a schematic view illustrating a coil component according to a second embodiment of the present disclosure, viewed from a lower side.
Figure 6:
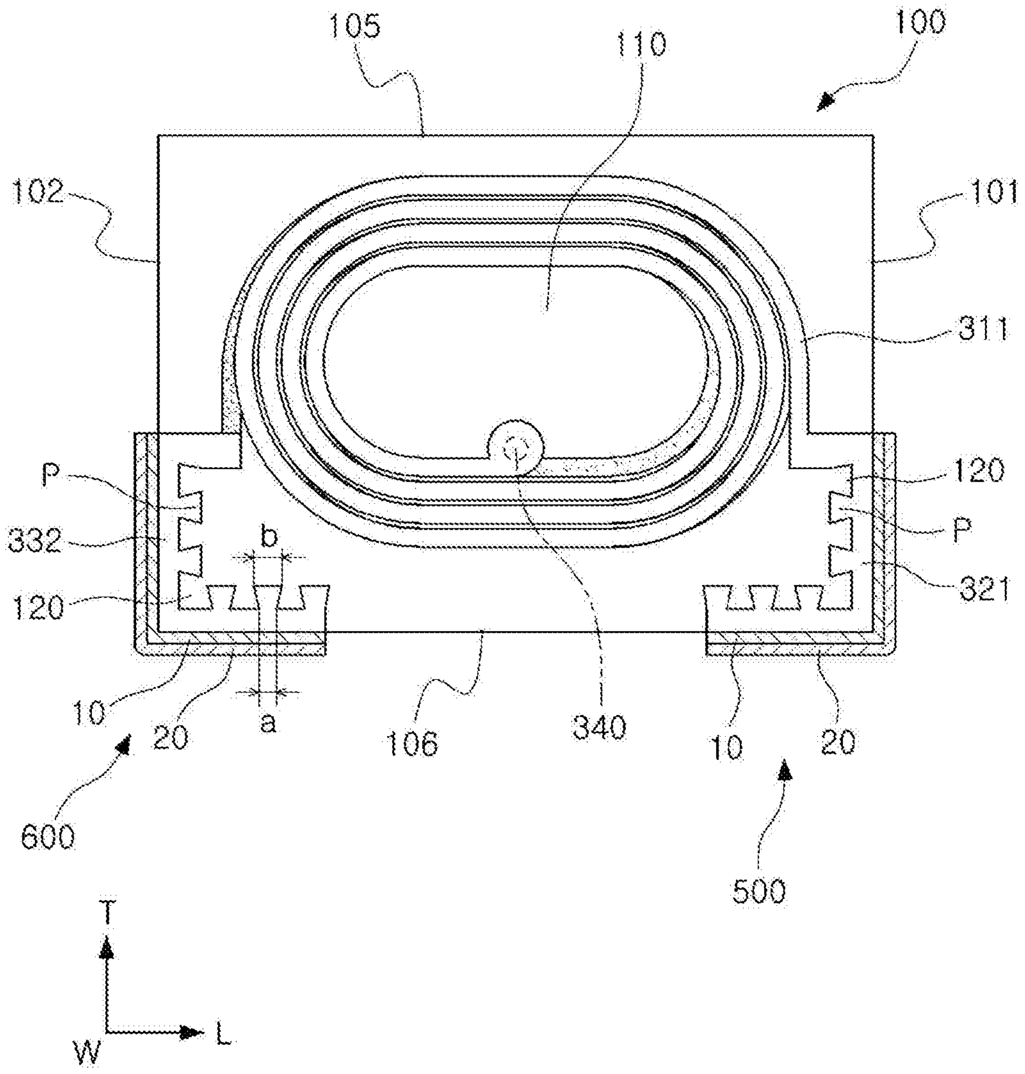
FIG. 6 is a schematic view of a coil component viewed in direction A in FIG. 5.

FIG. 5 is a schematic view illustrating a coil component according to a second embodiment, viewed from a lower side. FIG. 6 is a schematic view of a coil component, viewed in direction A in FIG. 5. On the other hand, FIG. 5 mainly illustrates the internal structure of a coil component according to the embodiment to facilitate understanding. Further, to facilitate understanding, some constructions applied to the embodiment are omitted from FIG. 5.

In comparing FIG. 3 with FIG. 5, and FIG. 4 with FIG. 6, in the case of a coil component 2000 according to the embodiment, the shape of a protrusion P is different from that of the coil component 1000 according to the first embodiment. The recesses between the protrusion P and the anchor portions 120 filling the recesses have shapes complementary to the protrusion P. In describing this embodiment, the protrusion P which is different from that of the first embodiment will be described below. For the remaining configurations in the embodiment, the above description of the first embodiment may be applied thereto as it is.

On the other hand, referring to FIG. 5, although the following description will be provided on the basis of the second auxiliary lead-out pattern 332, the descriptions below may be applied to the first and second lead-out patterns 321 and 322 and the first auxiliary lead-out pattern 331 as it is.

Referring to FIGS. 5 and 6, the protrusion P applied to the embodiment is formed to have a form in which a cross section thereof is gradually reduced in a direction from an inner side of the body 100 to the surfaces 101, 102, 103, 104, 105 and 106 of the body 100, for example, in the direction from the internal surfaces of the lead-out patterns 321 and 322 to the external surfaces thereof. For example, with reference to a cross section of the second auxiliary lead-out pattern 332, perpendicular to the width direction, for example, a cross section thereof in length L-thickness T directions of the body, the protrusion P is formed to have a trapezoidal shape in which a length b of a line segment disposed on an innermost side of the body 100 is greater than a length a of a line segment disposed on an outermost side of the body 100. Complementarily, the anchor portion 120 may be formed to have an inverted trapezoidal shape in which a width thereof increases from an inner side of the body 100 to an outer side of the body 100.

In this embodiment, coupling force between the lead-out patterns 321 and 322 and the auxiliary lead-out patterns 331 and 332, and the body 100, may be further improved, as the protrusion P and the anchor portion 120 are formed to have a trapezoidal cross-sectional shape and an inverted-trapezoidal cross sectional shape, complementary to each other.

Third Embodiment

Figure 7:
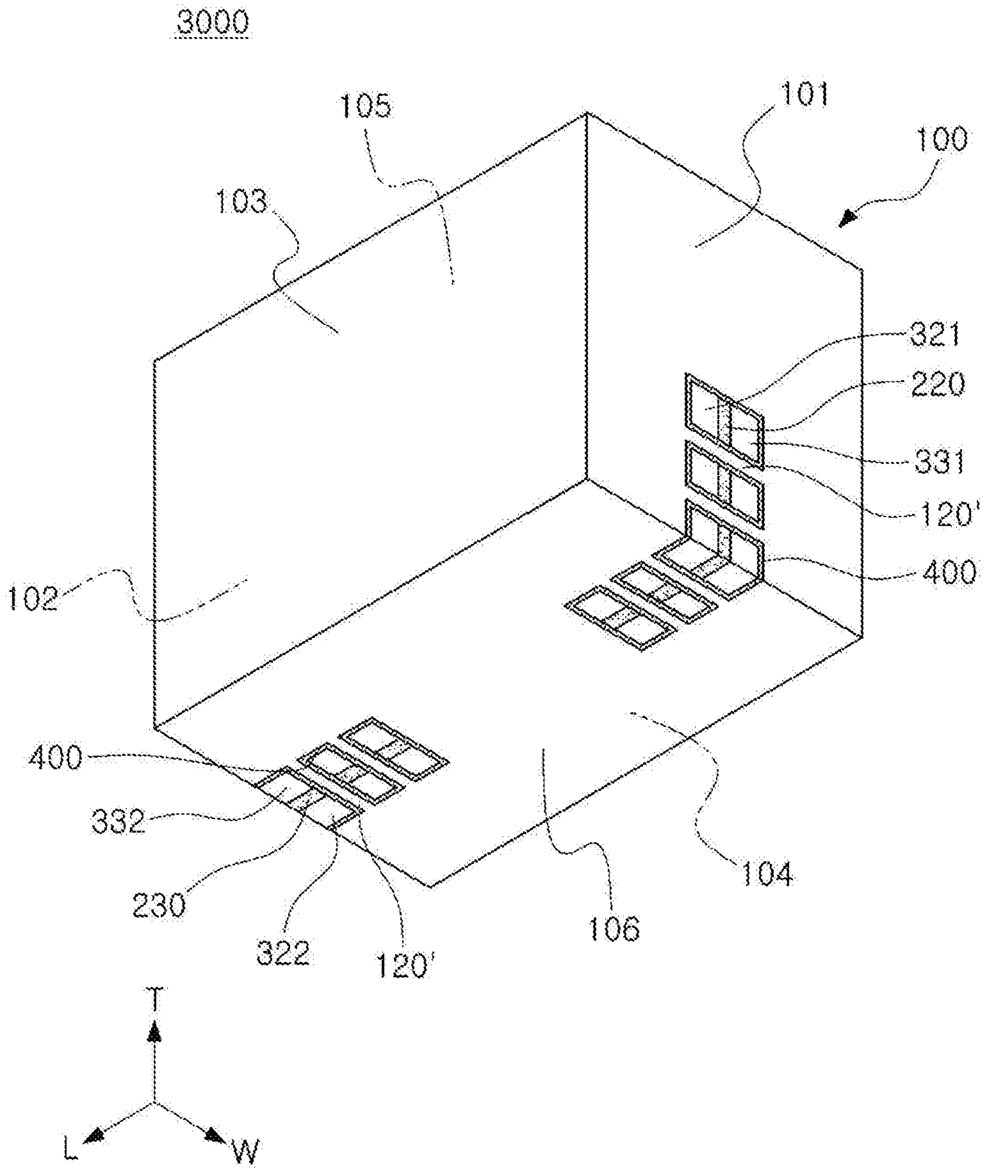
FIGS. 7 and 8 are schematic views of a coil component according to a third embodiment of the present disclosure, viewed from a lower side.
Figure 8:
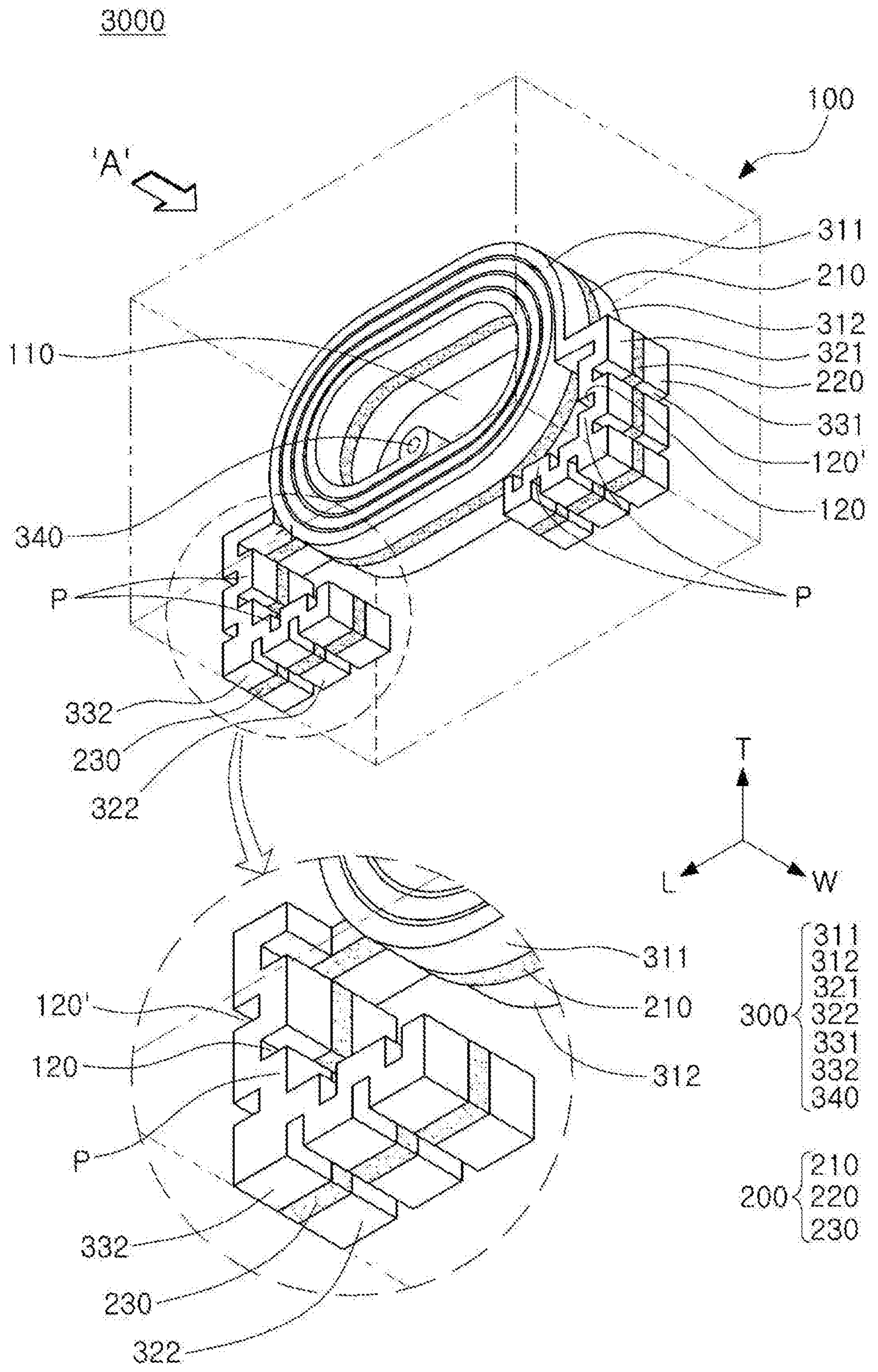
Figure 9:
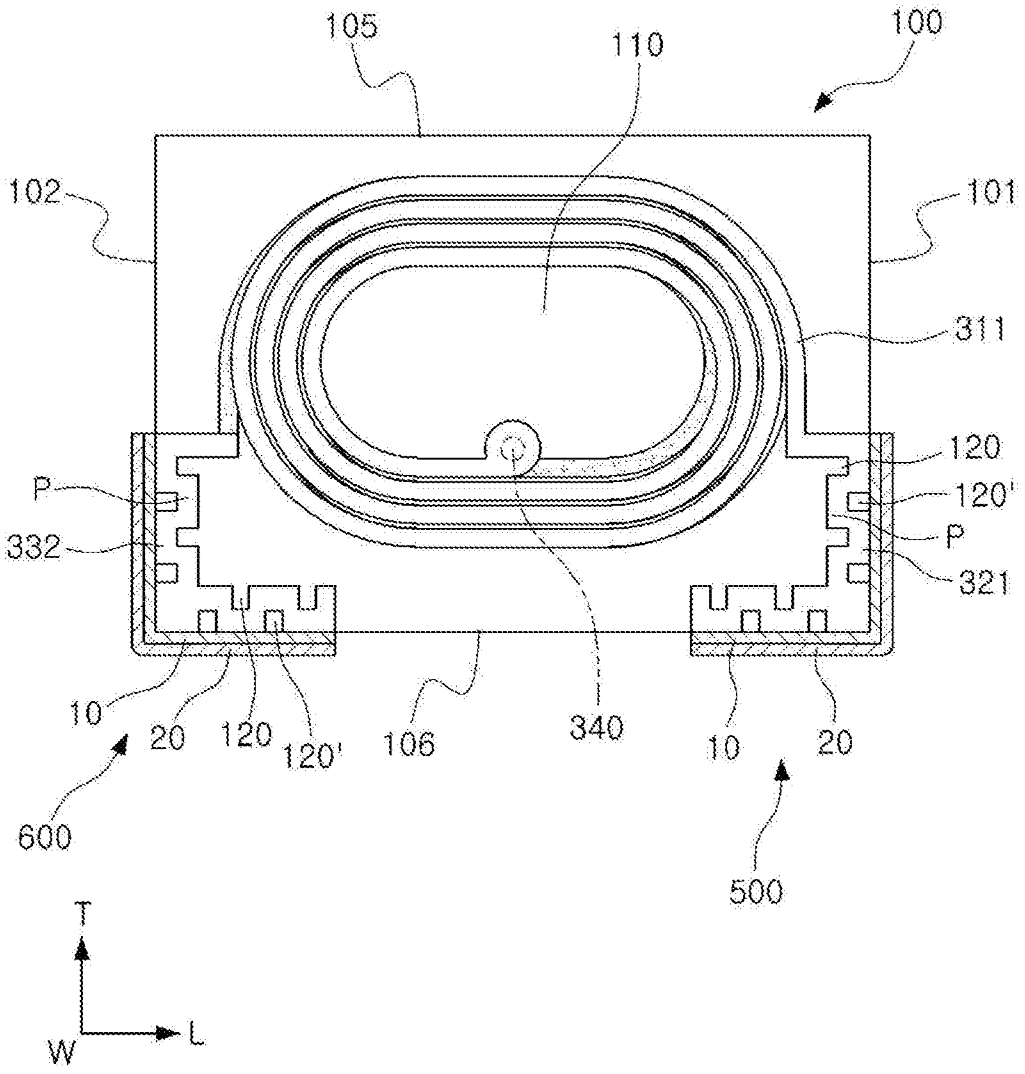
FIG. 9 is a schematic view of a coil component, viewed in direction A in FIG. 8.

FIGS. 7 and 8 are schematic views of a coil component according to a third embodiment, viewed from a lower side. FIG. 9 is a schematic view of a coil component, viewed in direction A in FIG. 8. On the other hand, for the sake of understanding, FIG. 7 mainly illustrates the appearance of the coil component according to the embodiment, and FIG. 8 mainly illustrates the internal structure of the coil component according to the embodiment. In addition, for ease of understanding, some configurations applied to the embodiment are omitted from FIGS. 7 and 8.

In comparing FIGS. 2 and 7, FIGS. 3 and 8, and FIGS. 4 and 9, respectively, a coil component 3000 according to the embodiment further includes an auxiliary anchor portion 120', as compared with the coil component 1000 according to the first embodiment. Therefore, in describing the embodiment, the auxiliary anchor portion 120', which is different from the configuration of the first embodiment, will be described. For the remaining configurations in the embodiment, the above description of the first embodiment may be applied thereto as it is.

Referring to FIGS. 7, 8 and 9, the body 100 applied to the coil component 3000 according to the embodiment further includes the auxiliary anchor portion 120' inserted into each of exposed surface sides of the lead-out patterns 321 and 322 and the auxiliary lead-out patterns 331 and 332.

The exposed surface of the auxiliary anchor portion 120' is disposed between the exposed surfaces of the adjacent first lead-out patterns 321, as illustrated in FIG. 7. Accordingly, in this embodiment, a first external surface, which is the exposed surface of the first lead-out pattern 321, is provided as a plurality of surfaces, spaced apart from each other, due to the exposed surface of the auxiliary anchor portion 120'. The first lead-out pattern 321 has a plurality of protruding regions on the first external surface due to the auxiliary anchor portions 120', similarly to the protrusion P protruding from the first internal surface. The auxiliary anchor portion 120' together with the anchor portion 120 may improve coupling force between the first lead-out pattern 321 and the body 100. For example, a surface area of the first lead-out pattern 321 increases due to the auxiliary anchor portion 120' and the anchor portion 120.

The anchor portion 120 and the auxiliary anchor portion 120' are disposed to be shifted from each other with respect to a cross section of the first lead-out pattern 321, perpendicular to the width direction, for example, a cross section thereof in length L-thickness T directions of the body. The arrangement of the anchor portion 120 and the auxiliary anchor portion 120' to be shifted from each other refers to the arrangement in which a centerline of the width of the anchor portion 120 and a centerline of the width of the auxiliary anchor portion 120' are not disposed on the same line segment, with respect to a cross section of the first lead-out pattern 321, perpendicular to the width direction, for example, a cross section thereof in length L-thickness T directions of the body. When the anchor portion 120 and the auxiliary anchor portion 120' are disposed to be shifted from each other, coupling reliability between the first lead-out pattern 321 and the body 100 may be secured even in a case in which shear stress occurs.

Although the above description is based on the first lead-out pattern 321, the above description may be applied to the second lead-out pattern 322 and the first and second auxiliary lead-out patterns 331 and 332 as is.

Fourth Embodiment

Figure 10:
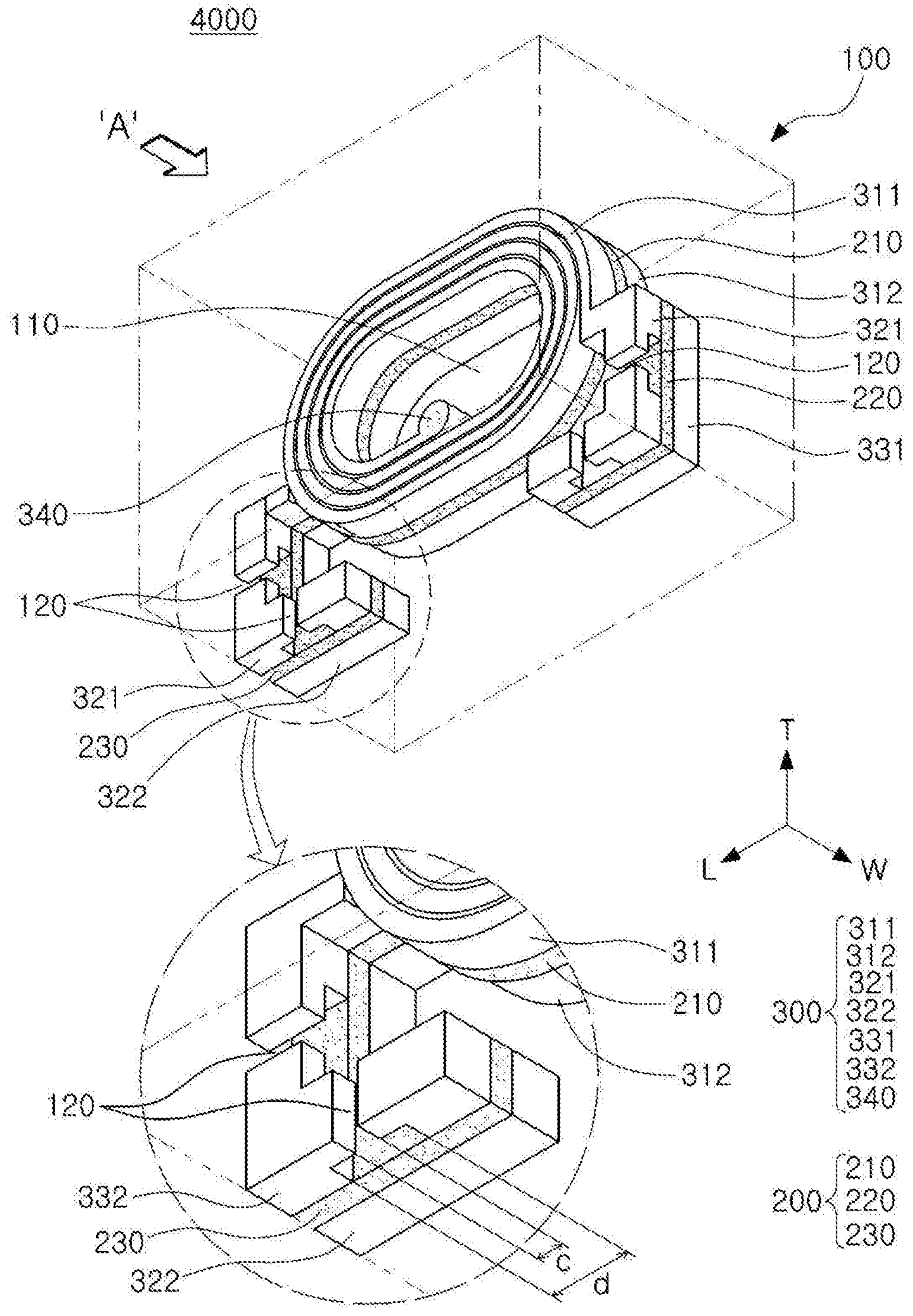
FIG. 10 is a schematic view illustrating a coil component according to a fourth embodiment of the present disclosure, viewed from a lower side.
Figure 11:
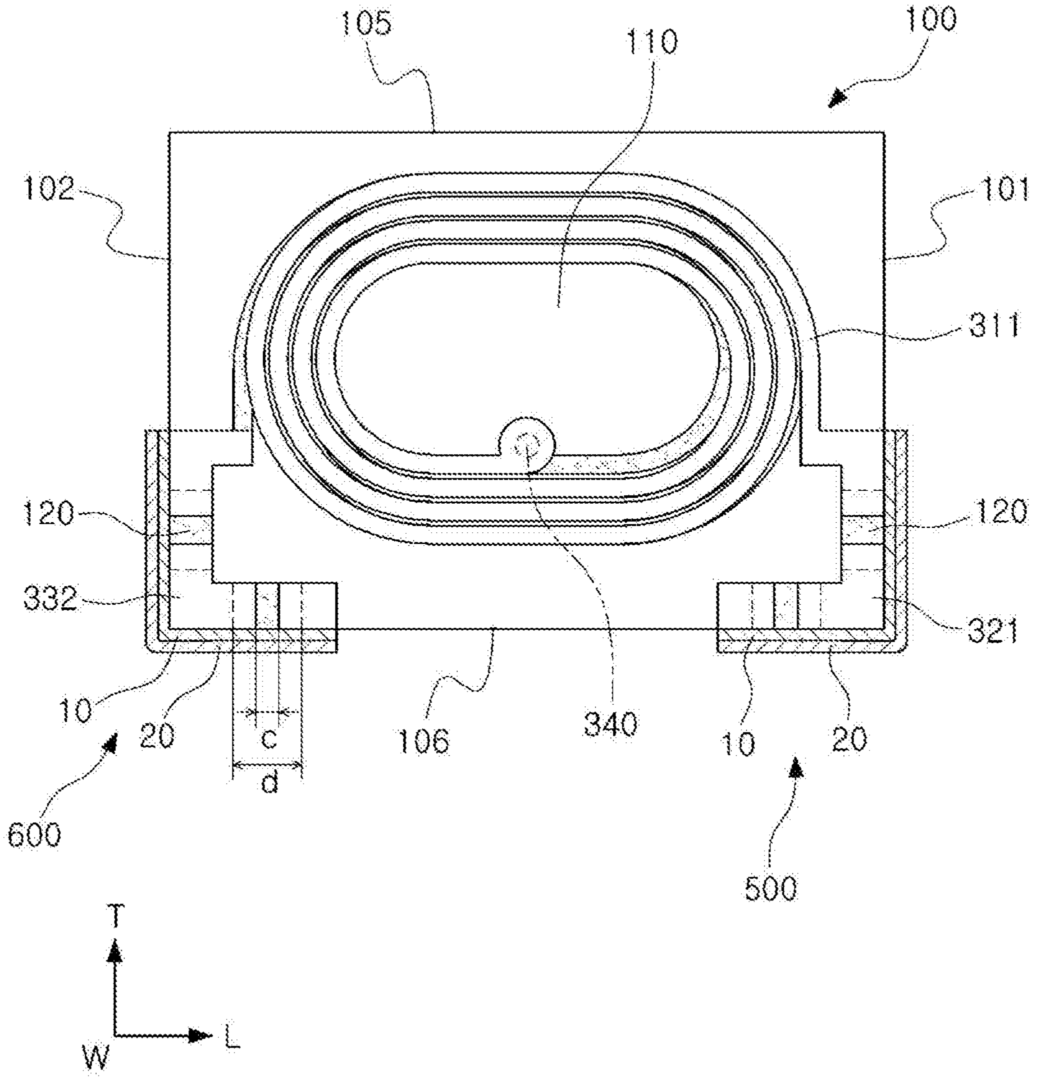
FIG. 11 is a schematic view of a coil component, viewed in direction A in FIG. 10.

FIG. 10 is a schematic view illustrating a coil component according to a fourth embodiment, viewed from a lower side. FIG. 11 is a schematic view of a coil component, viewed in direction A in FIG. 10. On the other hand, for ease of understanding, FIG. 10 mainly illustrates an internal structure of a coil component according to the embodiment. To facilitate understanding, in FIG. 10, some configurations applied to the embodiment are omitted.

In comparing FIGS. 3 and 10, and FIGS. 4 and 11, respectively, a coil component 4000 according to the embodiment is different from the coil component 1000 according to the first embodiment, in that a shape of an anchor portion 120 is different therefrom. Therefore, the anchor portion 120 different from that of the first embodiment will be described in describing the embodiment. For the remaining configurations in the embodiment, the above description of the first embodiment may be applied thereto as it is.

In the following, the embodiment is mainly described with the first lead-out pattern 321, but the following description may be applied to the second lead-out pattern 322 and the auxiliary lead-out patterns 331 and 332 as they are.

Referring to FIGS. 10 and 11, an anchor portion 120 applied to the coil component 4000 according to the embodiment passes through the first lead-out pattern 321, in the thickness direction of the first lead-out pattern 321, for example, in the width direction W of the body 100, and passes through the first lead-out pattern 321 in the width direction of the first lead-out pattern 321, for example, in the length direction L of the body or in the thickness direction T of the body. In detail, the anchor portion 120 may be disposed in a region of the first lead-out pattern 321 from which a portion of the first lead-out pattern 321 has been removed, to pass through the thickness and width of the first lead-out pattern 321.

With reference to a cross section of the first lead-out pattern 321 in a thickness direction (a cross section thereof in length L-width W directions of the body, based on a region of the first lead-out pattern exposed to the sixth surface of the body, and a cross section thereof in width W-thickness T directions of the body, based on a region of the first lead-out pattern exposed to the first surface of the body), the anchor portion 120 is formed in such a manner that a length d of a first region on the support substrate 200 side is greater than a length c of a second region disposed on the first region. For example, the anchor portion 120 is formed to have a shape in which the cross-sectional area thereof increases in the thickness direction of the first lead-out pattern 321. As a result, the region of the first lead-out pattern 321 in which the anchor part 120 is disposed may have a form similar to an undercut in which the width increases toward the bottom.

In this embodiment, coupling reliability between the lead-out patterns 321 and 322 and the body 100 may be maintained even in a case in which external force is applied in the width direction W of the body 100, compared with the foregoing embodiments.

As set forth above, according to an embodiment, reliability of coupling between a coil and a body may be secured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil component comprising:

a body having one surface, and one end surface and another end surface, respectively connected to the one surface and opposing each other;

a support substrate embedded in the body; and a coil portion disposed on the support substrate and including a first lead-out pattern and a second lead-out pattern, wherein the first lead-out pattern is exposed from the one surface of the body and the one end surface of the body, the second lead-out pattern is exposed from the one surface of the body and the other end surface of the body, the body includes an anchor portion disposed in each of the first and second lead-out patterns, the first lead-out pattern is disposed on one surface of the support substrate, the second lead-out pattern is disposed on another surface of the support substrate, the coil portion further includes a first auxiliary lead-out pattern disposed on the another surface of the support substrate to correspond to the first lead-out pattern, and a second auxiliary lead-out pattern disposed on the one surface of the support substrate to correspond to the second lead-out pattern, and the anchor portion extends to penetrate through the first and second auxiliary lead-out patterns in a thickness direction of the support substrate.

2. The coil component of claim 1, wherein the anchor portion penetrates through each of the first and second lead-out patterns and the support substrate in the thickness direction of the support substrate.

3. The coil component of claim 1, wherein the first lead-out pattern has a first external surface exposed from the one surface of the body and the one end surface of the body, and a first internal surface opposing the first external surface, the second lead-out pattern has a second external surface exposed from the one surface of the body and the other end surface of the body, and a second internal surface opposing the second external surface, and the anchor portion is disposed on first and second internal surface sides of the first and second lead-out patterns.

4. The coil component of claim 3, wherein the first external surface is continuously disposed on the one surface of the body and on the one end surface of the body, and the second external surface is continuously disposed on the one surface of the body and on the other end surface of the body.

5. The coil component of claim 3, wherein the body further comprises auxiliary anchor portions disposed on first and second external surface sides of the first and second lead-out patterns, respectively, wherein the anchor portion and the auxiliary anchor portions are disposed to be shifted from each other with reference to a cross section of the first and second lead-out patterns, perpendicular to a width direction of the body.

6. The coil component of claim 5, wherein the first external surface is provided as a plurality of first external surfaces, spaced apart from each other, on the one surface of the body and the one end surface of the body, and the second external surface is provided as a plurality of second external surfaces, spaced apart from each other, on the one surface of the body and the other end surface of the body.

7. The coil component of claim 3, wherein the anchor portion extends from the first and second internal surfaces of the first and second lead-out patterns to the first and second external surfaces of the first and second lead-out patterns, wherein the anchor portion has a length of a first region on the support substrate, greater than a length of a second region disposed on the first region, with respect to a cross section of the first and second lead-out patterns in a thickness direction of the body.

8. The coil component of claim 3, wherein each of the first and second lead-out patterns comprises a protrusion protruding from each of the first and second internal surfaces to the body, to be disposed between the anchor portions adjacent to each other.

9. The coil component of claim 8, wherein the protrusion has a length decreasing in a direction from the first internal surface to the first external surface, with respect to a cross section of the first lead-out pattern, perpendicular to a width direction.

10. The coil component of claim 1, wherein the anchor portion is provided as a plurality of anchor portions to be spaced apart from each other in each of the first and second lead-out patterns.

11. The coil component of claim 10, wherein the plurality of anchor portions in each of the first and second lead-out patterns are spaced apart from each other by a protrusion in each of the first and second lead-out patterns.

12. The coil component of claim 1, further comprising an insulating film disposed between each of the coil portion and the support substrate, and the body.

13. A coil component comprising:

a magnetic body;

a coil portion including a coil pattern and a lead-out pattern extending from the coil pattern to be exposed from two surfaces of the body, the two surfaces being connected to each other; and a support substrate including a support portion supporting the coil pattern, and a distal portion supporting the lead-out pattern, wherein one surface of the lead-out pattern, adjacent to the body, is provided with protruding patterns protruding inwardly of the body, the body includes an anchor portion disposed between the protruding patterns adjacent to each other, the lead-out pattern is disposed on one surface of the distal portion, the coil portion further includes an auxiliary lead-out pattern disposed on another surface of the distal portion opposite the one surface of the distal portion, and the anchor portion extends to penetrate through the auxiliary lead-out pattern in a thickness direction of the support substrate.

14. The coil component of claim 13, wherein the anchor portion is provided as a plurality of anchor portions, and the protruding patterns and the plurality of anchor portions are alternately disposed.

15. A coil component comprising:

a magnetic body;

a support substrate embedded in the magnetic body;

a coil portion disposed on the support substrate; and an insulating film disposed between the coil portion and the magnetic body, wherein the coil portion includes:

first and second lead-out patterns embedded in the magnetic body, exposed from one surface of the magnetic body and spaced apart from each other, while being respectively connected to the one surface of the magnetic body, and extending to and exposed from both of end surfaces of the magnetic body opposing each other, respectively, the magnetic body includes:

an anchor portion disposed on an internal surface side of the first and second lead-out patterns, opposing an exposed surface of the first and second lead-out patterns, the anchor portion passing through the first and second lead-out patterns in a thickness direction of the support substrate, wherein the insulating film is exposed from the one surface of the magnetic body and exposed from both of the end surfaces of the magnetic body, wherein each of the first and second lead-out patterns comprises a protrusion protruding inwardly of the body, and wherein the insulating film extends onto sidewalls of the protrusion and is disposed between the protrusion and the anchor portion of the body.

* * * * *